INVENTOR.
GLENN H. DUNLAP
BY ANTHONY M. KOBYLAK
W. A. Schaich &
Thomas A. Meehan
ATTORNEYS

United States Patent Office 3,582,305
Patented June 1, 1971

3,582,305
METHOD AND APPARATUS FOR THE MANUFACTURE OF A CONTOURED REDRAWN GLASS ARTICLE
Glenn H. Dunlap, Maumee, and Anthony M. Kobylak, Rossford, Ohio, assignors to Owens-Illinois, Inc.
Filed June 3, 1968, Ser. No. 734,011
Int. Cl. C03b 23/02
U.S. Cl. 65—106          10 Claims

ABSTRACT OF THE DISCLOSURE

This application discloses apparatus and method for the manufacture of a redrawn vitreous or glass article, viz an article of substantially greater length and substantially reduced cross-sectional area than the original article, in which the redrawn article is provided with a cross-sectional contour which is different from that of the original article. Contouring is accomplished by providing a pair of die members having opposed, complementary contoured article-contacting surfaces which the article passes between and in contact therewith along its path of travel after the article has cooled to a self-sustaining temperature following the longitudinal elongation and cross-sectional contraction of the article in a high temperature attenuation zone.

BACKGROUND AND SUMMARY OF THE INVENTION

In the glass manufacturing arts, it is known that a long glass article of small and longitudinally uniform cross-sectional area, or a series of shorter articles of such cross-sectional configuration formed by laterally severing a longer article, may be formed by redrawing a glass article of substantially shorter length and substantially greater cross-sectional area. Redrawing is accomplished by heating a portion of the length of the original or parent article to an elevated temperature preferably, for a major degree of cross-sectional reduction, a temperature which is approximately at the fiber softening temperature of the glass composition from which the article is formed, such heating being done in a longitudinally restricted pattern in a heating or attenuating zone. An end of the article is moved relatively rapidly away from the heating zone to effect a substantial longitudinal elongation and a substantial lateral or cross-sectional contraction of the heated portion of the article in the region of the heating zone. Simultaneously therewith the other end of the article and the heating zone are brought toward one another at a relatively slow speed in such a manner that the mass rate of parent article entering the heating zone is equal to the mass rate of attenuated article leaving the heating zone in order to maintain the cross-sectional shape and size of the attenuated article constant (assuming longitudinally constant cross-sectional shape and size in the parent article).

An article produced by a redrawing system of the type thus far described will have a cross-sectional shape which, though substantially smaller, will be substantially similar to that of the parent article, e.g. rectangular in the case of an article produced by redrawing a parellelpiped-shaped article. In many cases, however, the desired end use application of the redrawn article makes it desirable that such article have a cross-sectional shape different from that of the parent article. For example, the inventors are aware of an application for a redrawn transparent glass strip as a window for a slot in the face plate of a rectangular cathode-ray tube in which the face plate, in the region transversely of the slot, has a contour approximating a portion of the surface of a circular cylinder. The redrawn strip is soldered to the face plate by a solder glass composition to overlie the slot and, prior to the present invention, it was necessary to use a flat redrawn strip for such application. According to the prior approach to this problem it was necessary to forcibly bend such strip around its longitudinal axis during the step of soldering the strip to the faceplate of the tube. When a flat redrawn strip was used the soldering step was excessively time-consuming, it was accompanied by the breakage of an excessive number of redrawn sheets, and it frequently resulted in an unsightly window due to wrinkles caused by the uneven application of bending force to the redrawn sheet in the window soldering operation.

According to the present invention, however, it is possible to produce, from a parallelpiped-shaped glass bar or billet, a redrawn glass sheet or strip which is curved in a direction around an axis parallel to the longitudinal axis of the redrawn article, for example, to correspond to the curvature of a rectangular cathode ray bulb to which a length of such redrawn article is soldered, thereby greatly improving such soldering operation in the speed and quality thereof and greatly reducing the breakage of such lengths of redrawn article in the repetitive performance of such soldering operation. The contouring or curving of a glass article during a redrawing operation, according to the present invention, is accomplished by passing the attenuated article between opposed contouring dies having complementarily contoured article-contacting surfaces in such a manner as to form the article to the contour of such die surfaces without further redrawing of the article. To accomplish this it is necessary, by the construction and/or placement of the dies, to insure that the article, during the time that it is in contact with the dies, is at an elevated temperature so that it may be readily bent or contoured by contact with the dies, but which temperature nonetheless, is sufficiently below the fiber softening temperature to prevent further redrawing of the article by the limited frictional drag imparted to the article by the contouring dies. This requirement may be readily met by locating the contouring dies at a location subsequent to, or downstream of, the heating zone, to allow the attenuated article to cool somewhat from its attenuating temperature by heat transfer, for example by natural radiation and convection to ambient surroundings, and to maintain the dies in a position where they cannot be heated to a temperature substantially in excess of the temperature of the attenuated article as it moves into contact therewith.

Accordingly, the objects of the present invention are to provide method and apparatus for redrawing glass or vitreous articles to provide a redrawn article (or a series of redrawn articles formed by severing a single article), which has, with respect to the original article, a substantially reduced cross-sectional area and a different cross-sectional contour.

More specifically, the objects of the present invention are to provide method and apparatus for redrawing an elongate parallelepiped-shaped glass bar, billet or plate to provide a redrawn article which is of substantially reduced cross-sectional area and which has a transverse cross-sectional contour approximating the arc of a circle.

Further objects and a better understanding of the present invention will be apparent from the following description of the drawing, the detailed description of the invention and the claims.

DETAILED DESCRIPTION OF THE INVENTION

Figure 1:
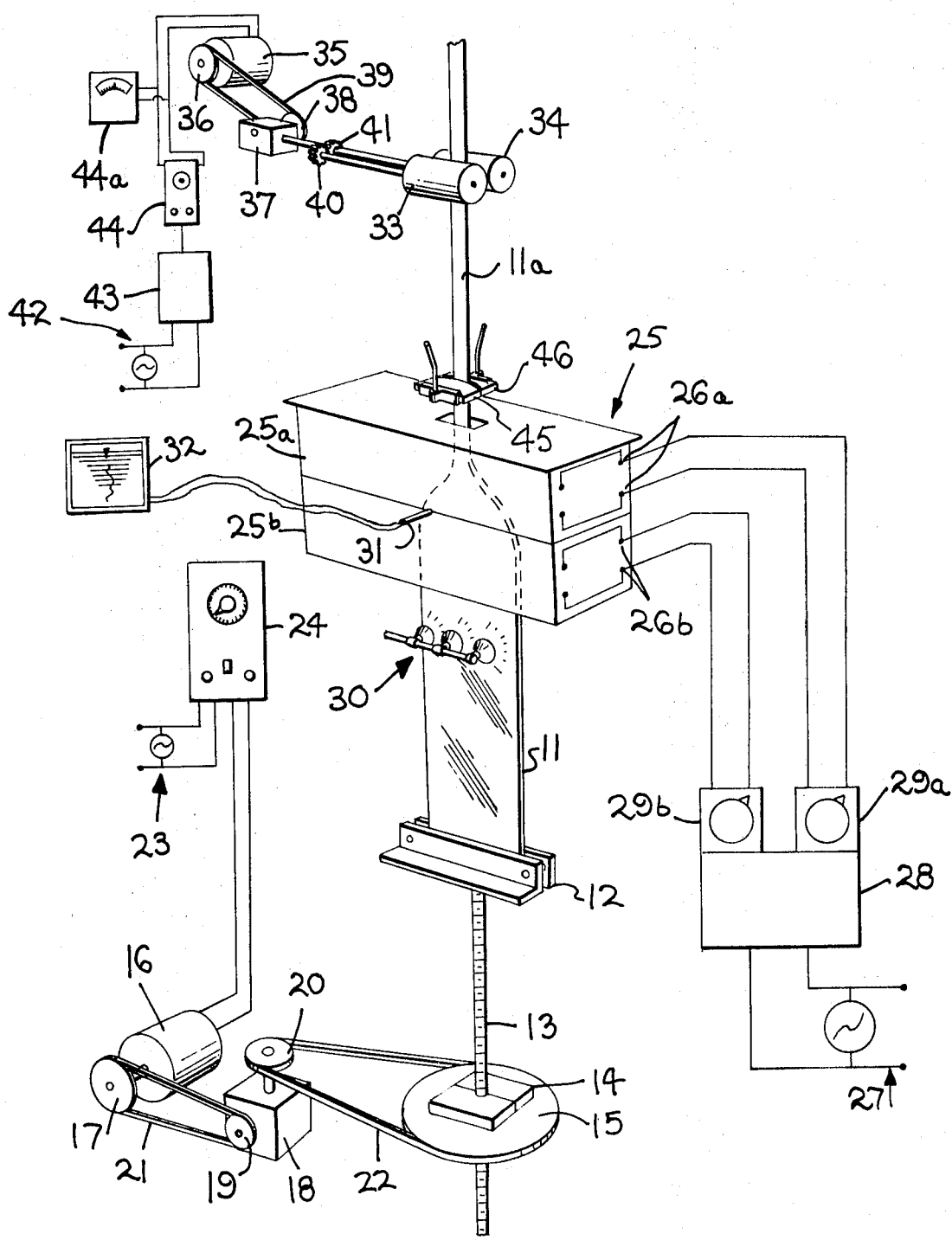
FIG. 1 is an elevational schematic view, in perspective, of equipment embodying the apparatus of the present invention and having utility in the practice of the method of the present invention.

In accordance with the embodiment of the invention illustrated in FIG. 1, which is a vertical updraw redrawing system, the lowermost end of a glass article 11 to be redrawn, for example an elongate glass plate, bar or billet of originally parallelepiped-shaped configuration, is firmly held in place by means of a clamping device 12. Clamping device 12 is attached to the uppermost end of an externally threaded rod 13 which passes through an internally threaded split nut 14. Split nut 14 is attached to a sheave 15 which is caused to rotate to and fro, to impart upward or downward movement to rod 13 and clamping device 12, as desired, by means of a drive system comprising a D.C. variable speed motor 16 with a sheave 17 on the output shaft thereof, a speed reducer 18 with sheaves 19 and 20 on the input and output shafts, respectively, thereof, endless drive belt 21 trained over sheaves 17 and 19, and endless drive belt 22 trained over sheaves 20 and 15. Prior to the start of the redrawing of a fresh glass billet, the drive system is operated to retract rod 13 and clamping device 12 to the lower of its predetermined upper and lower positions. During the redrawing operation, with the lower end of a fresh billet in place in clamping device 12, the drive system is operated to advance rod 12 toward its upper predetermined position at a controlled constant rate of travel. Motor 16 may be powered from an A.C. power source, shown schematically at 23, through a conventional rectifier and a conventional speed control device, shown as having a common cabinet 24.

A furnace 25, which is rectangularly shaped in cross-section (to correspond in the shape of billet 11), which is open at its lower end, and which is covered at its upper end by a sheet of insulation having a slit opening for exit of the attenuated article, is provided to surround and rapidly heat a longitudinally restricted portion of billet 11 during its upward travel. For accuracy of temperature control, furnace 25 is preferably divided into separately heated upper and lower zones 25a and 25b, respectively, each of which may be heated by electrical resistance elements having a pair of outlet termini 26a and 26b, respectively. Electric power may be conducted separately at separately controlled voltages to the heating elements of zones 25a and 25b from a common A.C. source 27 and a common transformer 28 through separate Variac voltage control devices 29a and 29b.

In the vertical updraw redrawing of articles of high expansion coefficient glass compositions, e.g. soda-lime glasses, it is advantageous to preheat the glass by a temperature of the order of 300° F. to avoid thermal shock in the furnace and radiant lamps 30 are provided for this purpose. Separate pre-heat means may not be needed in a vertical downdraw redraw system since heat rising naturally from the furnace will exert a pre-heating effect on the billet.

In operation, the input of power to zones 25a and 25b is controlled, by operation of Variac devices 29a and 29b, in conjunction with the mass rate of delivery of billet 11 to furnace 25, to bring the portion of billet 11 near the outlet of furnace 25 to an elevated temperature at which the glass may be redrawn. When the intended degree of redrawing is to be of major degree, it can be done most conveniently, i.e. under the influence of redrawing forces of readily attainable and manageable magnitude, when the temperature of the glass article is at least at, or near, the fiber softening temperature, viz. the temperature at which the log viscosity of the glass is 7.6. At substantially higher temperatures, the process is much more difficult to control and at substantially lower temperatures unnecessarily large redrawing forces are needed. Thermocouple 31 and temperature recorder 32 are provided to continuously monitor the temperature in furnace 25 so that manual adjustments of Variac devices 29a and/or 29b may be made to insure heating of billet 11 to the fiber softening temperature at the proper location. At a suitable redrawing temperature, e.g. a temperature at or near the fiber softening temperature, a glass article may, under the application of oppositely directed tensile forces, be elongated many many times in the direction of the tensile forces with of course, a proportionate reduction in cross-sectional area.

In the redrawing system of FIG. 1, oppositely directed tensile forces are applied to billet 11 by clamping device 12 and by counterrotating draw rollers 33 and 34 which engage a redrawn portion 11a of billet 11 at a location downstream of furnace 25. Rollers 33 and 34 may be considered to be rubber covered metal rollers and are driven to draw redrawn portion 11a away fom furnace 25 at a rate of speed which exceeds the rate of advance of clamping device 12 by a factor which equals the desired degree of cross-sectional reduction of billet 11 to its redrawn state 11a (thereby, for a billet of constant cross-section, maintaining the mass rate of movement of billet 11 into furnace 25 equal to the mass rate of movement of redrawn portion 11a out of the furnace). The powering of rollers 33 and 34 is effected by a drive system comprising a D.C. variable speed motor 35 with a sheave 36 on the output shaft thereof, a speed reducer 37 with a sheave 38 on the input shaft thereof and with its output shaft coupled directly to a shaft on which one of rollers 33 and 34 is mounted (shown as roller 34), an endless belt 39 trained around sheaves 36 and 38, and with engaging counterrotating gears 40 and 41 mounted on the shafts on which rollers 33 and 34 are mounted, respectively. Motor 35 is powered from an A.C. power source 42 through a conventional rectifier 43 and a conventional speed control potentiometer 44. A tachometer 44a is also provided to give a visual indication of the speed of motor 35.

The redrawn or attenuated portion 11a of the billet may be provided with a cross-sectional contour different from that of the original billet, for example, in the illustrated embodiment of the invention, the contour of an arc of a circle, by passing the redrawn or attenuated portion between a pair of die members 45 and 46 which have horizontally aligned complementarily contoured product-engaging opposed surfaces, such surfaces being spaced apart by a distance equal to, or very slightly in excess of, the thickness of the attenuated portion 11a of the billet. It is necessary that die members be so-constructed and/or so-located that the portion of attenuated article which is located therebetween is at a temperature sufficiently below the fiber softening temperature thereof to avoid a further or a secondary redraw by the frictional drag of the die members, but which temperature is, nonetheless, sufficiently high to obtain satisfactory and permanent bending of the article to correspond to the contour of the product-contacting surfaces of the die members. While it has been thought that this condition could be met by using hollow, internally cooled die members located very close to, or even within, the outlet of furnace 25, such construction would be considerably more complicated than, and with no apparent offsetting advantage over, the illustrated construction which employs solid die members, fabricated of a hard dense graphite for good temperature and wear resistance, and which are located a suitable distance downstream of (above) the outlet of furnace 25 to allow the attenuated article to cool to a suitable temperature by natural convection and radiation to ambient surroundings. In a vertical updraw redraw system of the type illustrated, the spacing between the furnace heating elements and the die members will necessarily be somewhat greater than in the other commonly used redraw system, viz, the vertical downdraw redraw system, due to the natural tendency of heat to rise.

Figure 3:
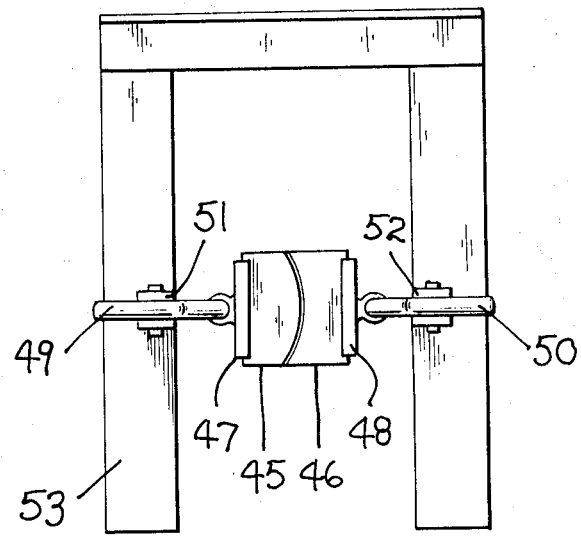
FIG. 3 is a plan view of the structure of FIG. 2.
Figure 2:
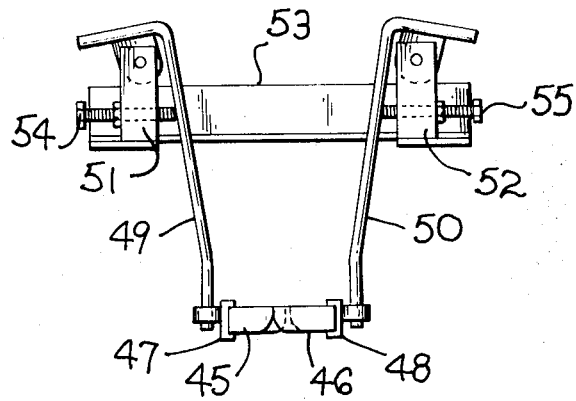
FIG. 2 is an elevation view of structure incorporating elements shown schematically in FIG. 2.

The product-contacting surfaces of die members 45 and 46, as is shown more clearly in FIGS. 2 and 3, are flared outwardly away from one another at their upstream or lower ends and the die members are each securely engaged along the rear edges thereof by C-shaped brackets 47 and 48, respectively. Brackets 47 and 48 are secured to and are suspended from inverted, generally L-shaped rod-like members 49 and 50, respectively. Members 49 and 50 are pivoted at their upper portions for limited arcuate movement in a common vertical plane transversely of the spacing between die members 45 and 46 from upright members 51 and 52, respectively. Upright members 51 and 52, in turn, are attached, respectively to opposite legs of a horizontally-situated U-shaped structural member 53. Structural member 53, in turn, may be considered to comprise a portion of or to be attached to the general structural framework which is provided to support furnace 25 and other elements of the apparatus, which framework is otherwise not shown because it may be of a routine and readily determined nature and because it would detract from the clarity of the illustration and description of the significant features of the invention. Rod-like members 49 and 50 are maintained in preferred adjustable positions along their arcs of travel by threaded members 54 and 55, respectively, which pass through members 51 and 52 and against which members 49 and 50 are urged by gravity.

While die members with opposed surfaces complementarily contoured to the arc of a circle have been described, it is to be understood that a wide variety of other contours may be employed, depending on the end use application for the redrawn product. Also, the movement of billet 11 into furnace 25 is, in the illustrated embodiment of the invention, accomplished by advancing clamping device 12 toward furnace 25, it is to be understood that it is within the inventors contemplation that an equivalent effect could be obtained by mounting the furnace for reciprocatory movement and the clamping device in a stationary manner and by advancing the furnace toward the clamping device during the redrawing cycle.

It is thought that the invention may be better understood from the following example, which is not to be construed as limiting the scope of the invention an any way.

EXAMPLE

A 36-inch long by 7½-inch wide by 0.075-inch thick glass billet of a soda-lime composition of the type marketed under the tradename Fourco Clearlite, and having a published fiber softening temperature of 1302° F., was satisfactorily redrawn in vertical updraw redraw equipment of the type illustrated in FIG. 1 to a width in the specified range of ⅝–¾ inch and to a thickness specified as 0.005 inch±0.001 inch. Such redrawn product was contoured to curved shape, in a direction transversely of the longitudinal axis thereof, to a radius of curvature in the specified range of 1⅜–1½ inches by contoured graphite die members located not over one-quarter of an inch above the upper opening of an open-ended rectangular heating furnace 14 inches high by 4½ by 16 inches internal dimensions. The furnace was heated along each of its longer sides by a pair of rectangularly-shaped coiled resistors 5½ inches high by 13 inches wide which were mounted directly above each other and centered between the upper and lower edges of the furnace. The lateral spacing between the sets of elements on opposed sides was 4½ inches. The furnace was heated to a temperature, at the mid-point and ⅛ inch in from the elements, of 1300° F. The feed rate of parent billet to the furnace was set at 44 inches/hour and the feed rate of redrawn product from the furnace was set at 150 inches/minute. The redrawn product was severed into lengths of approximately three feet by the operator, by scribing with a sharp tool along a relatively straight line on the inner or concave surface of the redrawn product. Approximately 196 feet of satisfactory redrawn product were produced, the remainder of the glass in the original billet, comprising a portion at each end thereof, being scrapped due to the inherently batch-type nature of the redrawing operation.

The invention, and an operative embodiment thereof, has been described above in terms sufficiently full, clear, concise and exact as to enable any person skilled in the art to make and use the same. It is to be understood, however, that it is within our contemplation that certain modifications of the above-described mode of practicing the invention can be made by a skilled artisan without departing from the scope of the invention and it is, therefore, desired to limit the invention only in accordance with the appended claims.

We claim:

1. Apparatus for redrawing an elongate vitreous article having a pair of opposed surfaces into an article of substantially greater length, of substantially lesser cross-sectional area and of a different lateral contour than the original article, said apparatus comprising, in combination: a furnace surrounding the article for a portion of its major dimension for heating the article in said surrounded portion to an elevated redrawing temperature; drawing means for drawing a first end of the article in a path of travel longitudinally of the major dimension of the article away from the other end of the article and away from the furnace to longitudinally stretch the article and to laterally contract the article in a region which is at the redrawing temperature; and a pair of opposed die members having opposed surfaces which are complementarily contoured according to a contour different from the contour of the opposed surfaces of the article and which contact the opposed surfaces of the longitudinally stretched and laterally contracted article at a location upstream of the drawing means, where the temperature of the article has cooled from its redrawing temperature to a temperature which is sufficiently high to permit bending of the article, whereby the article is bent to conform to the contour of said surfaces of the die members.

2. Apparatus according to claim 1 wherein the die members are positioned to contact the opposed surfaces of the article at a location between the furnace and the drawing means.

3. Apparatus, according to claim 1 wherein advancing means are provided to advance the other end of the article and the furnace toward one another at a first given speed and wherein the drawing means is effective to draw the first end away from the furnace and the other end at a second given speed which is substantially greater than the first given speed.

4. Apparatus according to claim 3 wherein the vitreous article is vertically aligned, wherein the furnace is stationary, wherein the first end is the upper end, wherein the drawing means is effective to advance the first end upwardly, wherein the advancing means is effective to advance the other end upwardly, and wherein the furnace is effective to heat the article to a temperature approximately at the fiber softening temperature of the material from which the article is formed.

5. Apparatus according to claim 1 wherein each of the die members is comprised of a solid, dense, wear-resistant graphite bar.

6. Apparatus according to claim 5 wherein the die members are provided with complementary concave and convex article-contacting surfaces, respectively, the article contacting surface of each die member having a substantially constant radius of curvature, whereby the contour of the redrawn glass article will be that of an arc of a circle.

7. Apparatus according to claim 5 wherein the inlet portions of the opposed surfaces of the die members are flared outwardly away from each other and away from contact with the article.

8. In the method of redrawing a glass article having a pair of opposed surfaces into an article of substantially greater length and substantially lesser cross-sectional area, comprising the steps of heating a longitudinally restricted portion of the article around its periphery to an elevated redrawing temperature in a heating zone and advancing the article through the heating zone in such a manner that a portion of the article downstream of the heating zone is advanced at a higher rate than a portion of the article upstream of the heating zone to apply an elongating force to the portion of the article comprising the heated portion and thereby to effect longitudinal stretching and lateral contracting of the heated portion, the improvement comprising bending the longitudinally extended and laterally contracted article to change the lateral contour thereof by the steps of: engaging opposed surfaces of the longitudinally extended and laterally contracted article, at a location where the article has cooled from the redrawing temperature to a temperature which is sufficiently high to permit the article to be bent, by the opposed complementary product-contacting surfaces of a pair of opposed die members, said product-contacting surfaces being contoured differently from the lateral contour of the opposed surfaces of the longitudinally extended and laterally contracted article to correspond to the contour desired in the redrawn article, whereby the article is bent.

9. The method of claim 8 wherein the article is oriented in a vertically upright position during the redrawing operation, wherein the upper end is advanced vertically upwards relative to the lower end during the redrawing operation, and wherein the article passes between the opposed dies at a location above the location where the article is heated by the heating means.

10. The method of claim 9 wherein the article is an elongate parallelepiped-shaped article, wherein the heating means surrounds a portion of the article spaced between its upper and lower ends, wherein the upper end is advanced upwardly away from the heating means at a first predetermined speed, wherein the lower end is advanced upwardly toward the heating means at a second predetermined speed which is substantially lower than the first predetermined speed, and wherein the article is heated to a temperature approximately at the fiber softening temperature of the glass composition from which the article is formed.

References Cited

UNITED STATES PATENTS

| | | | |
|---|---|---|---|
| 1,608,644 | 11/1926 | Black | 65—185 |
| 1,724,793 | 8/1929 | Clark et al. | 65—275X |
| 2,140,213 | 12/1938 | Tegarty | 65—106X |
| 3,425,454 | 2/1969 | Eakins et al. | 65—13X |

ARTHUR D. KELLOGG, Primary Examiner

U.S. Cl. X.R.

65—13, 243, 273, 275, 374